US010993196B2

(12) United States Patent
Jung et al.

(10) Patent No.: US 10,993,196 B2
(45) Date of Patent: Apr. 27, 2021

(54) IDENTIFYING SYNCHRONIZATION SIGNAL/PHYSICAL BROADCAST CHANNEL BLOCK OCCASIONS

(71) Applicant: Lenovo (Singapore) PTE. LTD., New Tech Park (SG)

(72) Inventors: Hyejung Jung, Northbrook, IL (US); Alexander Johann Maria Golitschek Edler von Elbwart, Darmstadt (DE); Vijay Nangia, Woodridge, IL (US); Prateek Basu Mallick, Dreieich (DE); Joachim Loehr, Wiesbaden (DE); Ravi Kuchibhotla, Clarendon Hills, IL (US); Robert T. Love, Barrington, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/537,474

(22) Filed: Aug. 9, 2019

(65) Prior Publication Data
US 2020/0053670 A1   Feb. 13, 2020

Related U.S. Application Data

(60) Provisional application No. 62/717,733, filed on Aug. 10, 2018.

(51) Int. Cl.
*H04W 56/00*   (2009.01)
(52) U.S. Cl.
CPC ................... *H04W 56/00* (2013.01)
(58) Field of Classification Search
CPC ................................................. H04W 56/00
See application file for complete search history.

(56) References Cited

U.S. PATENT DOCUMENTS

2014/0341035 A1*  11/2014  Bhushan .............. H04L 27/2602
                                                                370/235
2018/0198659 A1*  7/2018  Ko ...................... H04L 27/2662
(Continued)

OTHER PUBLICATIONS

QUALCOMM Incorporated, "Initial access and mobility procedures for NR unlicensed", 3GPP TSG RAN WG1 Meeting #93 R1-1807390, May 21-25, 2018, pp. 1-4.
(Continued)

*Primary Examiner* — Fahmida S Chowdhury
(74) *Attorney, Agent, or Firm* — Kunzler Bean & Adamson

(57) ABSTRACT

Apparatuses, methods, and systems are disclosed for identifying synchronization signal/physical broadcast channel block occasions. One method includes identifying a plurality of synchronization signal/physical broadcast channel block occasions configured to enable reception of a plurality of synchronization signal/physical broadcast channel blocks. A first number of synchronization signal/physical broadcast channel block occasions of the plurality of synchronization signal/physical broadcast channel block occasions is greater than a maximum allowed number of synchronization signal/physical broadcast channel blocks of the plurality of synchronization signal/physical broadcast channel blocks. The method includes receiving the plurality of synchronization signal/physical broadcast channel blocks on a portion of the plurality of synchronization signal/physical broadcast channel block occasions.

20 Claims, 7 Drawing Sheets

(56) References Cited

U.S. PATENT DOCUMENTS

| | | | |
|---|---|---|---|
| 2019/0109700 A1* | 4/2019 | Liu | H04L 27/2692 |
| 2019/0253124 A1* | 8/2019 | Awada | H04B 7/0695 |
| 2019/0306832 A1* | 10/2019 | Si | H04W 72/042 |
| 2019/0335406 A1* | 10/2019 | Akkarakaran | H04W 24/08 |
| 2020/0260417 A1* | 8/2020 | Jo | H04W 72/0446 |

OTHER PUBLICATIONS

3GPP, "3rd Generation Partnership Project; Technical Specification Group Radio Access Network; NR; Multiplexing and channel coding (Release 15)", 3GPP TS 38.212 V15.2.0, Jun. 2018, pp. 1-98.

Ericssom, "On initial access, RRM, mobility and RLM", 3GPP TSG-RAN WG1 Meeting #93 R1-1806254, May 21-25, 2018, pp. 1-8.

3GPP, "3rd Generation Partnership Project; Technical Specification Group Radio Access Network; Evolved Universal Terrestrial Radio Access (E-UTRA); Physical channels and modulation (Release 15)", 3GPP TS 36.211 V15.2.0, Jun. 2018, pp. 1-236.

3GPP, "3rd Generation Partnership Project; Technical Specification Group Radio Access Network; NR; Physical channels and modulation (Release 15)", 3GPP TS 38.211 V15.2.0, Jun. 2018, pp. 1-96.

3GPP, "3rd Generation Partnership Project; Technical Specification Group Radio Access Network; NR; Physical layer procedures for control (Release 15)", 3GPP TS 38.213 V15.2.0, Jun. 2018, pp. 1-99.

3GPP, "3rd Generation Partnership Project; Technical Specification Group Radio Access Network; Physical layer procedures for shared spectrum channel access (Release 15)", 3GPP TS 37.213 V15.0.0, Jun. 2018, pp. 1-20.

3GPP, "3rd Generation Partnership Project; Technical Specification Group Radio Access Network; NR; User Equipment (UE) procedures in Idle mode and RRC Inactive state (Release 15)", 3GPP TS 38.304 V15.0.0, Jun. 2018, pp. 1-25.

PCT/IB2019/000932, "Notification of Transmittal of the International Search Report and the Written Opinion of the International Searching Authority, or the Declaration", PCT International Searching Authority, dated Jan. 14, 2020, pp. 1-14.

\* cited by examiner

IDENTIFYING SYNCHRONIZATION SIGNAL/PHYSICAL BROADCAST CHANNEL BLOCK OCCASIONS

CROSS-REFERENCE TO RELATED APPLICATIONS

This application claims priority to U.S. Patent Application Ser. No. 62/717,733 entitled "APPARATUSES, METHODS, AND SYSTEMS FOR ACCESSING A NETWORK IN AN UNLICENSED SPECTRUM" and filed on Aug. 10, 2018 for Hyejung Jung, which is incorporated herein by reference in its entirety.

FIELD

The subject matter disclosed herein relates generally to wireless communications and more particularly relates to identifying synchronization signal/physical broadcast channel block occasions.

BACKGROUND

The following abbreviations are herewith defined, at least some of which are referred to within the following description: Third Generation Partnership Project ("3GPP"), 4$^{th}$ Generation ("4G"), 5$^{th}$ Generation ("5G"), 5G System ("5GS"), Positive-Acknowledgment ("ACK"), Aggregation Level ("AL"), Access and Mobility Management Function ("AMF"), Access Network ("AN"), Access Point ("AP"), Authentication Server Function ("AUSF"), Beam Failure Detection ("BFD"), Binary Phase Shift Keying ("BPSK"), Base Station ("BS"), Buffer Status Report ("BSR"), Bandwidth ("BW"), Bandwidth Part ("BWP"), Carrier Aggregation ("CA"), Contention-Based Random Access ("CBRA"), Clear Channel Assessment ("CCA"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Device-to-Device ("D2D"), Dual Connectivity ("DC"), Discrete Fourier Transform Spread ("DFTS"), Downlink Control Information ("DCI"), Downlink ("DL"), Demodulation Reference Signal ("DMRS"), Data Radio Bearer ("DRB"), Discovery Reference Signal ("DRS"), Discontinuous Reception ("DRX"), Downlink Pilot Time Slot ("DwPTS"), Enhanced Clear Channel Assessment ("eCCA"), EPS Connection Management ("ECM"), Enhanced Mobile Broadband ("eMBB"), Evolved Node B ("eNB"), Effective Isotropic Radiated Power ("EIRP"), European Telecommunications Standards Institute ("ETSI"), Evolved Packet Core ("EPC"), Evolved Packet System ("EPS"), Evolved Universal Terrestrial Access ("E-UTRA"), Evolved Universal Terrestrial Access Network ("E-UTRAN"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Identity or Identifier ("ID"), Information Element ("IE"), Industrial IoT ("IIoT"), International Mobile Equipment Identity ("IMEI"), International Mobile Subscriber Identity ("IMSI"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Least Significant Bit ("LSB"), Long Term Evolution ("LTE"), Multiple Access ("MA"), Medium Access Control ("MAC"), Multimedia Broadcast Multicast Services ("MBMS"), Modulation Coding Scheme ("MCS"), Maximum Channel Occupancy Time ("MCOT"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Most Significant Bit ("MSB"), Machine Type Communication ("MTC"), Multiple TRPs ("multi-TRPs"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Next Generation RAN ("NG-RAN"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), LTE-to-V2X Interface ("PC5"), Primary Cell ("PCell"), Policy Control Function ("PCF"), Physical Cell ID ("PCID"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Paging Frame ("PF"), Physical Hybrid ARQ Indicator Channel ("PHICH"), Power Headroom ("PH"), Power Headroom Report ("PHR"), Physical Layer ("PHY"), Public Land Mobile Network ("PLMN"), Paging Occasion ("PO"), Physical Random Access Channel ("PRACH"), Physical Resource Block ("PRB"), Primary Secondary Cell ("PSCell"), Primary Synchronization Signal ("PSS"), Physical Uplink Control Channel ("PUCCH"), Physical Uplink Shared Channel ("PUSCH"), Quasi Co-Located or Quasi Co-Location ("QCL"), Quality of Service ("QoS"), Quadrature Phase Shift Keying ("QPSK"), Registration Area ("RA"), Radio Access Network ("RAN"), Radio Access Technology ("RAT"), Random Access Channel ("RACH"), Random Access Preamble Identity ("RAPID"), Random Access Response ("RAR"), Resource Block ("RB"), Resource Element ("RE"), Resource Element Group ("REG"), Radio Link Control ("RLC"), Radio Link Monitoring ("RLM"), Radio Network Temporary Identifier ("RNTI"), Reference Signal or Reference Signals ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), System Frame Number ("SFN"), System Information Block ("SIB"), SystemInformationBlockType1 ("SIB1"), SystemInformationBlockType2 ("SIM"), Subscriber Identity/Identification Module ("SIM"), Signal-to-Interference-Plus-Noise Ratio ("SINR"), Service Level Agreement ("SLA"), Synchronization Signal/PBCH Block Measurement Time Configuration ("SMTC"), Session Management Function ("SMF"), Special Cell ("SpCell"), Single Network Slice Selection Assistance Information ("S-NSSAI"), Shortened TTI ("sTTI"), Synchronization Signal ("SS"), SS/PBCH Block ("SSB"), Secondary Synchronization Signal ("SSS"), Supplementary Uplink ("SUL"), Subscriber Permanent Identifier ("SUPI"), Tracking Area ("TA"), TA Indicator ("TAI"), Transport Block ("TB"), Transport Block Size ("TBS"), Transmission Configuration Indicator ("TCI"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane ("UP"), Uplink Pilot Time Slot ("UpPTS"), Ultra-reliability and Low-latency Communications ("URLLC"), UE Route Selection Policy ("URSP"), LTE Radio Interface ("Uu"), Vehicle-To-Everything ("V2X"), Visiting AMF ("vAMF"), Visiting NSSF ("vNSSF"), Visiting PLMN ("VPLMN"), Wake Up Signal ("WUS"), Interconnecting Interface ("X2") ("Xn"), and Worldwide Interoperability for Microwave Access ("WiMAX").

In certain wireless communications networks, multiple synchronization signal/physical broadcast channel blocks are transmitted. In such networks, different resources may be used to transmit the synchronization signal/physical broadcast channel blocks.

BRIEF SUMMARY

Methods for identifying synchronization signal/physical broadcast channel block occasions are disclosed. Apparatuses and systems also perform the functions of the apparatus. One embodiment of a method includes identifying a plurality of synchronization signal/physical broadcast channel block occasions configured to enable reception of a plurality of synchronization signal/physical broadcast channel blocks. In such an embodiment, a first number of synchronization signal/physical broadcast channel block occasions of the plurality of synchronization signal/physical broadcast channel block occasions is greater than a maximum allowed number of synchronization signal/physical broadcast channel blocks of the plurality of synchronization signal/physical broadcast channel blocks. In certain embodiments, the method includes receiving the plurality of synchronization signal/physical broadcast channel blocks on a portion of the plurality of synchronization signal/physical broadcast channel block occasions.

One apparatus for identifying synchronization signal/physical broadcast channel block occasions includes a processor that identifies a plurality of synchronization signal/physical broadcast channel block occasions configured to enable reception of a plurality of synchronization signal/physical broadcast channel blocks. In such an embodiment, a first number of synchronization signal/physical broadcast channel block occasions of the plurality of synchronization signal/physical broadcast channel block occasions is greater than a maximum allowed number of synchronization signal/physical broadcast channel blocks of the plurality of synchronization signal/physical broadcast channel blocks. In some embodiments, the apparatus includes a receiver that receives the plurality of synchronization signal/physical broadcast channel blocks on a portion of the plurality of synchronization signal/physical broadcast channel block occasions.

Another embodiment of a method includes identifying a plurality of synchronization signal/physical broadcast channel block occasions configured to enable transmission of a plurality of synchronization signal/physical broadcast channel blocks. In such an embodiment, a first number of synchronization signal/physical broadcast channel block occasions of the plurality of synchronization signal/physical broadcast channel block occasions is greater than a maximum allowed number of synchronization signal/physical broadcast channel blocks of the plurality of synchronization signal/physical broadcast channel blocks. In certain embodiments, the method includes transmitting the plurality of synchronization signal/physical broadcast channel blocks on a portion of the plurality of synchronization signal/physical broadcast channel block occasions.

One apparatus for identifying synchronization signal/physical broadcast channel block occasions includes a processor that identifies a plurality of synchronization signal/physical broadcast channel block occasions configured to enable transmission of a plurality of synchronization signal/physical broadcast channel blocks. In such an embodiment, a first number of synchronization signal/physical broadcast channel block occasions of the plurality of synchronization signal/physical broadcast channel block occasions is greater than a maximum allowed number of synchronization signal/physical broadcast channel blocks of the plurality of synchronization signal/physical broadcast channel blocks. In some embodiments, the apparatus includes a transmitter that transmits the plurality of synchronization signal/physical broadcast channel blocks on a portion of the plurality of synchronization signal/physical broadcast channel block occasions.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
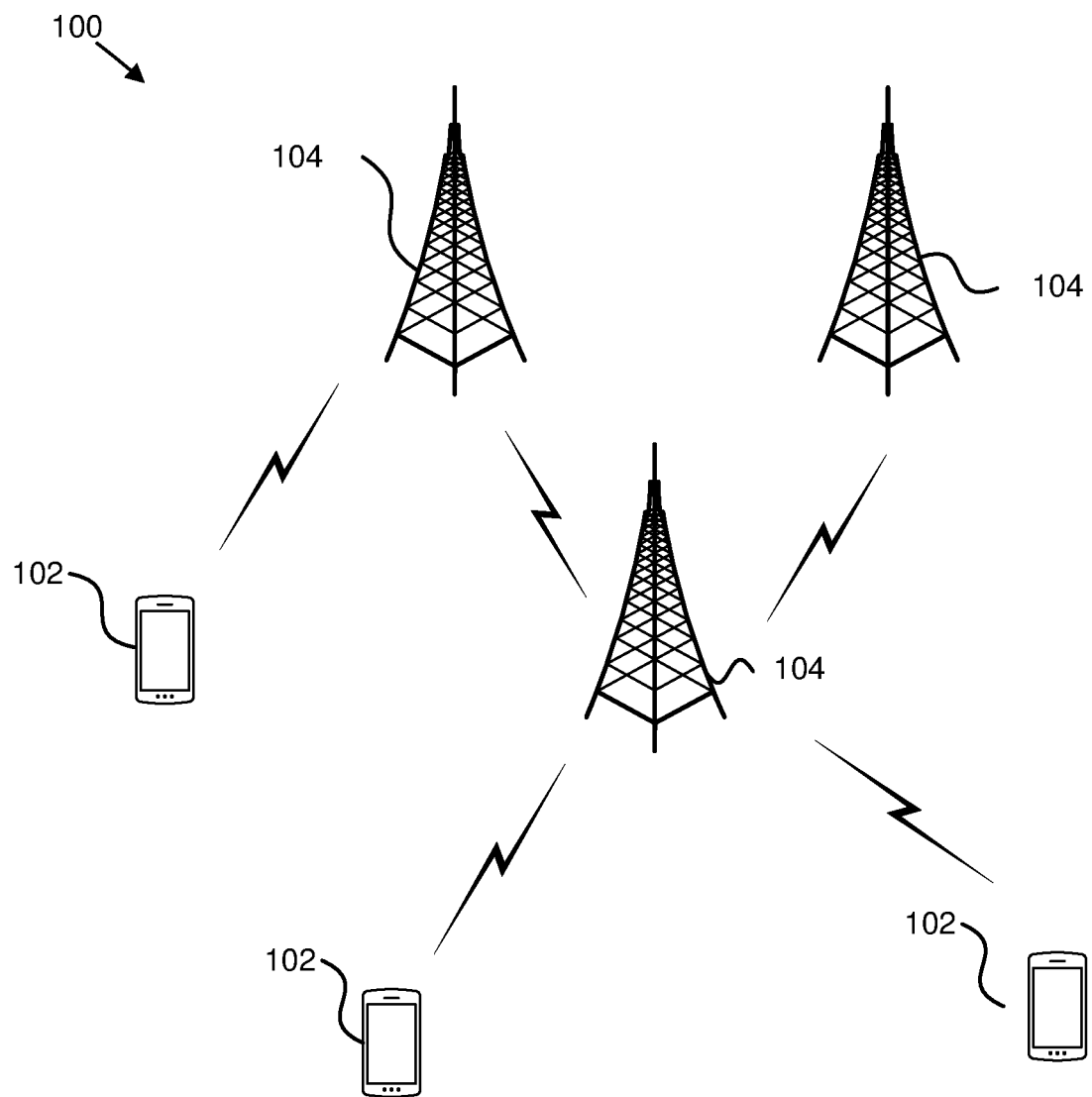
FIG. 1 is a schematic block diagram illustrating one embodiment of a wireless communication system for identifying synchronization signal/physical broadcast channel block occasions.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for identifying synchronization signal/physical broadcast channel block occasions. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. The remote units 102 may also communicate directly with one or more of the other remote units 102.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may identify a plurality of synchronization signal/physical broadcast channel block occasions configured to enable reception of a plurality of synchronization signal/physical broadcast channel blocks. In such an embodiment, a first number of synchronization signal/physical broadcast channel block occasions of the plurality of synchronization signal/physical broadcast channel block occasions is greater than a maximum allowed number of synchronization signal/physical broadcast channel blocks of the plurality of synchronization signal/physical broadcast channel blocks. In certain embodiments, the remote unit 102 may receive the plurality of synchronization signal/physical broadcast channel blocks on a portion of the plurality of synchronization signal/physical broadcast channel block occasions. Accordingly, the remote unit 102 may be used for identifying synchronization signal/physical broadcast channel block occasions.

In certain embodiments, a network unit 104 may identify a plurality of synchronization signal/physical broadcast channel block occasions configured to enable transmission of a plurality of synchronization signal/physical broadcast channel blocks. In such embodiments, a first number of synchronization signal/physical broadcast channel block occasions of the plurality of synchronization signal/physical broadcast channel block occasions is greater than a maximum allowed number of synchronization signal/physical broadcast channel blocks of the plurality of synchronization signal/physical broadcast channel blocks. In various embodiments, the network unit 104 may transmit the plurality of synchronization signal/physical broadcast channel blocks on a portion of the plurality of synchronization signal/physical broadcast channel block occasions. Accordingly, the network unit 104 may be used for identifying synchronization signal/physical broadcast channel block occasions.

Figure 2:
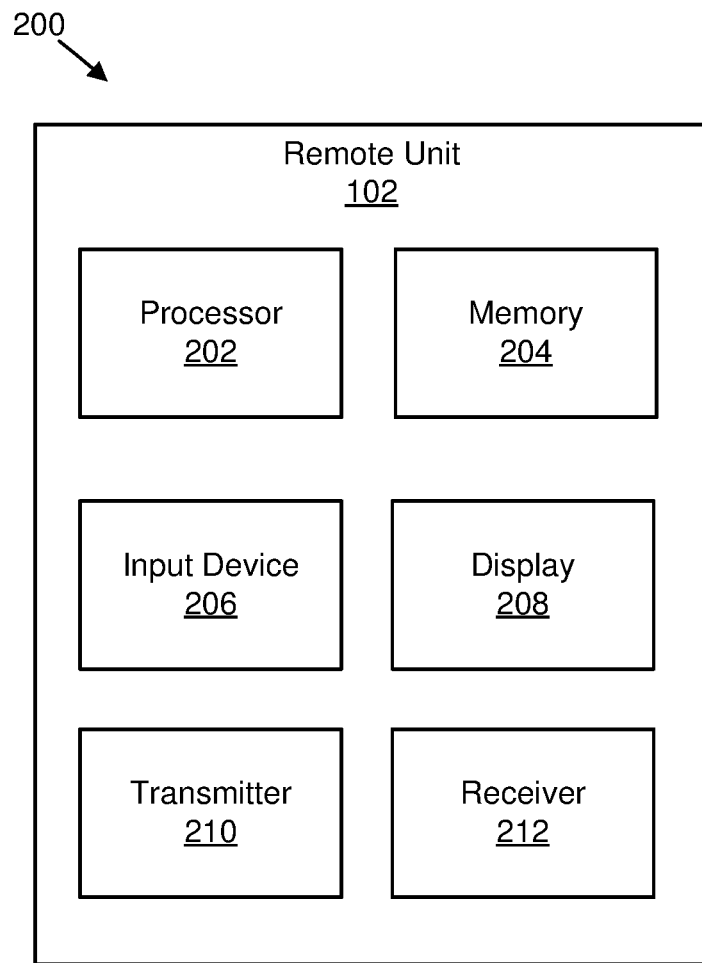
FIG. 2 is a schematic block diagram illustrating one embodiment of an apparatus that may be used for identifying synchronization signal/physical broadcast channel block occasions.

FIG. 2 depicts one embodiment of an apparatus 200 that may be used for identifying synchronization signal/physical broadcast channel block occasions. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may identify a plurality of synchronization signal/physical broadcast channel block occasions configured to enable reception of a plurality of synchronization signal/physical broadcast channel blocks. In such embodiments, a first number of synchronization signal/physical broadcast channel block occasions of the plurality of synchronization signal/physical broadcast channel block occasions is greater than a maximum allowed number of synchronization signal/physical broadcast channel blocks of the plurality of synchronization signal/physical broadcast channel blocks. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the receiver 212 receives the plurality of synchronization signal/physical broadcast channel blocks on a portion of the plurality of synchronization signal/physical broadcast channel block occasions.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
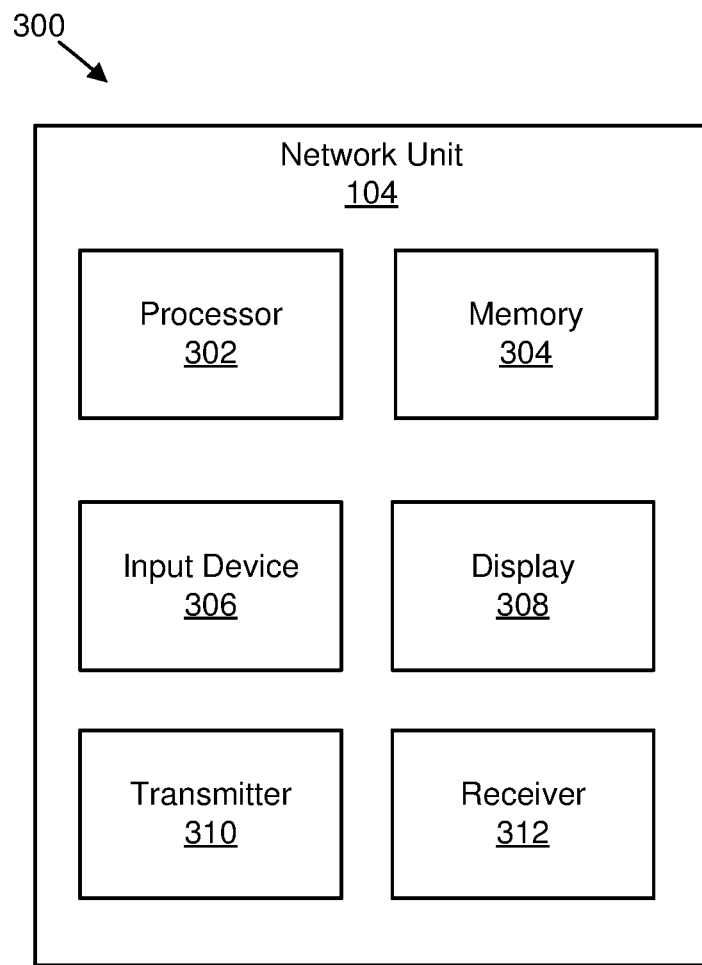
FIG. 3 is a schematic block diagram illustrating one embodiment of an apparatus that may be used for identifying synchronization signal/physical broadcast channel block occasions.

FIG. 3 depicts one embodiment of an apparatus 300 that may be used for identifying synchronization signal/physical broadcast channel block occasions. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, the processor 302 identifies a plurality of synchronization signal/physical broadcast channel block occasions configured to enable transmission of a plurality of synchronization signal/physical broadcast channel blocks. In such embodiments, a first number of synchronization signal/physical broadcast channel block occasions of the plurality of synchronization signal/physical broadcast channel block occasions is greater than a maximum allowed number of synchronization signal/physical broadcast channel blocks of the plurality of synchronization signal/physical broadcast channel blocks. In some embodiments, the transmitter 310 transmits the plurality of synchronization signal/physical broadcast channel blocks on a portion of the plurality of synchronization signal/physical broadcast channel block occasions.

In certain embodiments, 3GPP NR-based access to unlicensed spectrum (e.g., 5 GHz, 6 GHz, 37 GHz, and 60 GHz) with wider bandwidth (e.g., 80 MHz or 100 MHz) may provide additional radio resources necessary to achieve multi-Gbps data rates. In some embodiments, NR in an unlicensed spectrum may include NR LAA anchored to a legacy LTE carrier by DC or anchored to an NR carrier by CA and a stand-alone operation of NR in unlicensed spectrum.

In certain embodiments, unlicensed technologies may comply with certain regulations (e.g., LBT for fair coexistence between cellular operations and other technologies such as Wi-Fi as well as between cellular operators themselves) for minimizing interference to other users. Various embodiments described herein may be used to transmit initial access signals and/or channels (e.g., one or more SS/PBCH blocks and remaining minimum system information) in an unlicensed spectrum.

In various embodiments, regarding NR operation in a licensed spectrum, for a half frame with SS/PBCH blocks, an index of a first symbol for each of candidate SS/PBCH blocks may be determined based on a subcarrier spacing of SS/PBCH blocks as follows, where symbol index 0 corresponds to a first symbol of a first slot in a half-frame: A) 15 kHz subcarrier spacing: the first symbols of the candidate SS/PBCH blocks have indexes of $\{2, 8\}+14*n$. For carrier frequencies smaller than or equal to 3 GHz, n=0, 1. For carrier frequencies larger than 3 GHz and smaller than or equal to 6 GHz, n=0, 1, 2, 3; B) 30 kHz subcarrier spacing: the first symbols of the candidate SS/PBCH blocks have indexes $\{4, 8, 16, 20\}+28*n$. For carrier frequencies smaller than or equal to 3 GHz, n=0. For carrier frequencies larger than 3 GHz and smaller than or equal to 6 GHz, n=0, 1; C) 30 kHz subcarrier spacing: the first symbols of the candidate SS/PBCH blocks have indexes $\{2, 8\}+14*n$. For carrier frequencies smaller than or equal to 3 GHz, n=0, 1. For carrier frequencies larger than 3 GHz and smaller than or equal to 6 GHz, n=0, 1, 2, 3; D) 120 kHz subcarrier spacing: the first symbols of the candidate SS/PBCH blocks have indexes $\{4, 8, 16, 20\}+28*n$. For carrier frequencies larger than 6 GHz, n=0, 1, 2, 3, 5, 6, 7, 8, 10, 11, 12, 13, 15, 16, 17, 18; and E) 240 kHz subcarrier spacing: the first symbols of the candidate SS/PBCH blocks have indexes $\{8, 12, 16, 20, 32, 36, 40, 44\}+56*n$. For carrier frequencies larger than 6 GHz, n=0, 1, 2, 3, 5, 6, 7, 8.

From the above cases A), B), C), D), and E) for a set of first symbol indexes of candidate SS/PBCH blocks, an applicable case for a cell depends on a respective frequency band. As used herein, a reference SS/PBCH block location may refer to a set of pre-defined SSB time locations.

In some embodiments, candidate SS/PBCH blocks in a half frame are indexed in an ascending order in time from 0 to L−1. In such embodiments, a UE may determine a number of bits (e.g., 2 LSB bits for L=4, or 3 LSB bits for L>4) of a SS/PBCH block index per half frame from a one-to-one mapping with an index of the DMRS sequence transmitted in a PBCH. In certain embodiments, for L=64, a UE may determine 3 MSB bits of the SS/PBCH block index per half frame by PBCH payload bits $\bar{a}_{\bar{A}5}, \bar{a}_{\bar{A}6}, \bar{a}_{\bar{A}7}$ using any suitable method, such as a method described in 3GPP TS 38.212.

In certain embodiments, a UE may have a periodicity of half frames for reception of SS/PBCH blocks per serving cell configured per serving cell by a higher layer parameter (e.g., ssb-periodicityServingCell). In various embodiments, if a UE is not configured for a periodicity of half frames for reception of SS/PBCH blocks, the UE may assume a certain periodicity of a half frame. In such embodiments, a UE may assume that the periodicity is the same for all SS/PBCH blocks in a serving cell.

In some embodiments, an MCOT may be determined based on a channel access priority class per Table 1.

TABLE 1

Channel Access Priority Class

| Channel Access Priority Class (p) | $m_p$ | $CW_{min,p}$ | $CW_{max,p}$ | $T_{m\ cot,p}$ | Allowed $CW_p$ Sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In one embodiment, a UE may receive an indication of a time shift of an SSB burst with respect to a reference SSB burst location in a time domain in which the SSB burst includes a set of candidate SSBs within a half frame. In certain embodiments, such as for an MCOT of 8 ms or 10 ms, a network entity (e.g. gNB) may transmit up to 64

Figure 4:
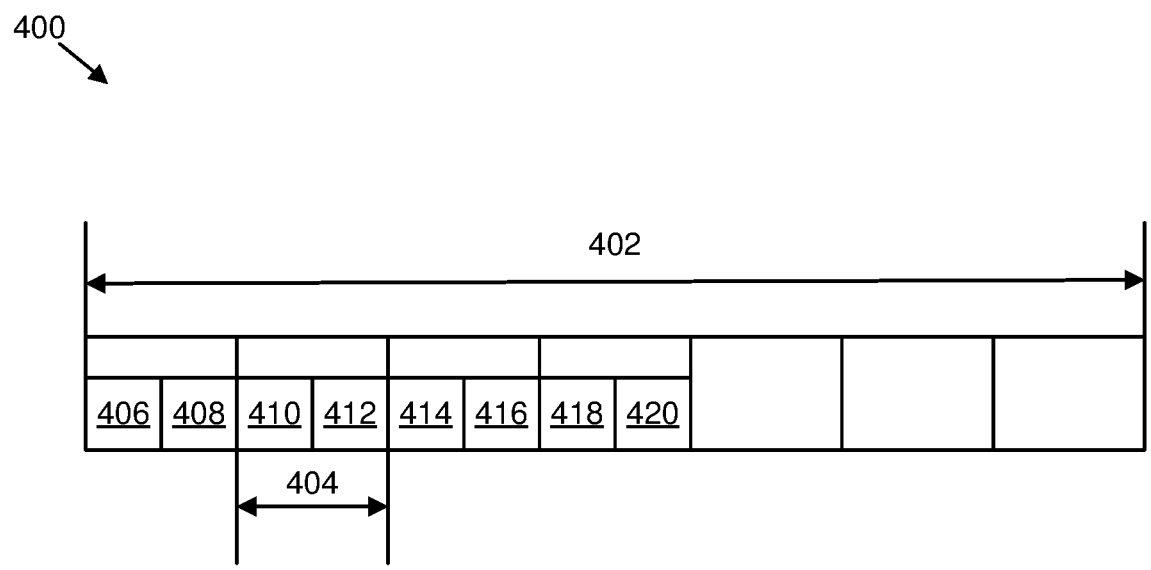
FIG. 4 is a schematic block diagram illustrating one embodiment of a reference SSB transmission timing.
Figure 5:
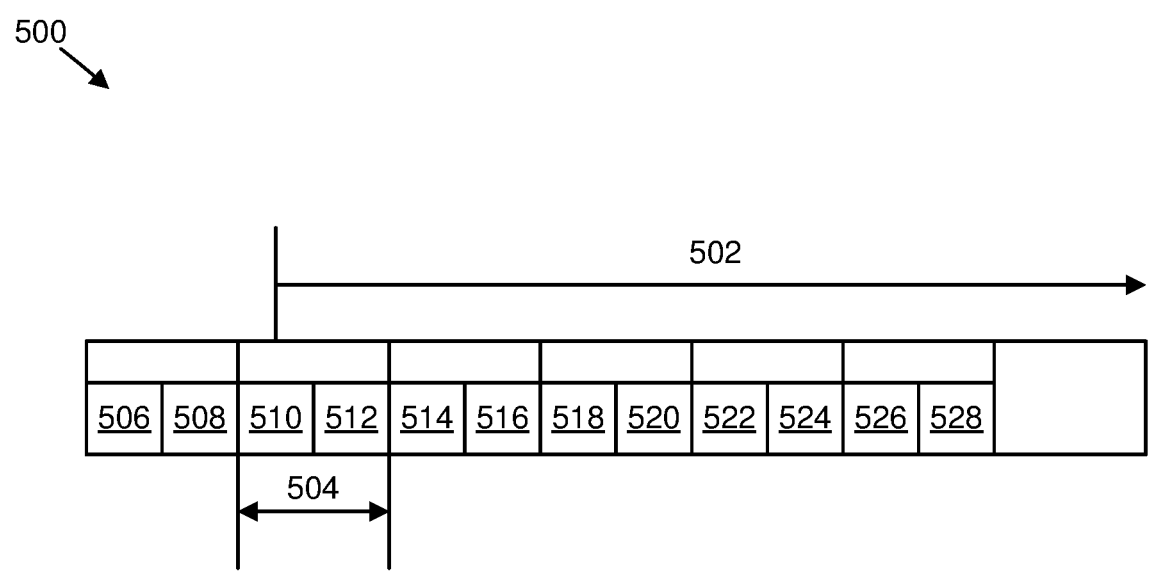
FIG. 5 is a schematic block diagram illustrating one embodiment of an SSB shifting corresponding to the reference SSB transmission timing of FIG. 4.

SS/PBCH blocks within one channel occupancy, and an entire SSB burst may be time-shifted from a reference location as shown in FIGS. 4 and 5. In various embodiments, an indication of a time shift may be included in a broadcast message such as MIB or SIB1 or appended to information bits corresponding to MIB or SIB1. In some embodiments, an indication of a time shift may be included in a UE-specific RRC message or appended to information bits corresponding to the UE-specific RRC message.

In certain embodiments, an indication of a time shift may be transmitted on a common SSB indicator broadcast channel other than PBCH and may be located on symbols towards an end of an SSB transmission (e.g., to give a network entity sufficient time to prepare a broadcast message with shift indicator values following success to access the channel) (e.g., on symbols 3 and/or 4 of an SSB block and RBs adjacent to the SSB block—RB on top and/or bottom of the SSB block for the SS/PBCH block and CORESET multiplexing pattern 1), on symbols following an SSB block transmission (e.g., on RBs of an SSB and on symbol between an SSB candidates in a slot such as with 15 kHz or 30 kHz SCS) or symbols after a last SSB candidate in a slot or slot-pairs (e.g., for 240 kHz SCS). In one embodiment, an indication of a time shift may be transmitted on a common (e.g., group) PDCCH DCI scrambled with a specific RNTI (e.g., SSB-RNTI) on a common search space with a fixed PDDCH candidate position of a particular aggregation level or a limited set of PDCCH blind decoding candidates—the search space location may be in the same slot (or adjacent slot for 240 kHz SCS SSB) and on a subset of the SSB symbols or adjacent symbols to the SSB block similar to a location of a common SSB indicator broadcast channel. For example, a search space may be a Type0-PDCCH common search space for SS/PBCH block and CORESET multiplexing pattern 2 and 3. In another example, a position (e.g., first symbol index) of a Type0PDCCH common search space for a SSB may be moved for an unlicensed carrier (e.g., to give the network entity sufficient time to prepare the common PDCCH with a shift indicator value following successful access to a channel) towards an end of the SSB block, on symbols following SSB block transmission (e.g., on symbol between SSB candidates in a slot (e.g., 15 kHz SCS, 30 kHz SCS), or symbols after the last SSB candidate in a slot or slot-pairs (e.g., for 240 kHz SCS) instead of a first symbol index on a first symbol of an SSB or before the first symbol of the SSB.

In one embodiment, a UE receives a PBCH in a shifted SS/PBCH block indicating an SFN and time location of a half frame that includes an SSB burst within a radio frame for the reference SSB burst location. In such an embodiment, the indication in PDSCH carrying SIB1 (or RMSI) includes a time shift value in terms of a number of slots and a one-bit indicator to inform the UE of an SSB candidate selected from 2 candidates of a given slot as SSB index 0 for the shifted SSB burst. As may be appreciated, considering that the largest supported subcarrier spacing of a SS/PBCH block is 240 kHz and the largest supported SSB burst periodicity is 160 ms, a number of possible slot shift values is 2560 (e.g., 16 slots per 1 ms×160 ms). Therefore, a maximum number of bits required to indicate a time shift value in terms of a number of slots is 12, and a total of 13 bits are included in PDSCH carrying SIB1 for indicating the timing offset of the time shifted SSB burst with respect to the reference SSB burst location. In some embodiments, a UE may determine timing of a reference SSB burst based on a received indication in SIB1, and for later detection windows, may first perform SSB detection at periodically occurring reference SSB burst locations before blindly searching for an SSB. In certain embodiments, an indication in PDSCH carrying SIB1 may include a time shift value in terms of a number of SSB occasions. In such embodiments, assuming 2 SSB occasions per slot, a maximum of 5119 (e.g., 2 SSB occasions per slot×16 slots per 1 ms×160-ms) SSB occasion shift is possible for 160 ms SSB burst periodicity (e.g., this may use a 13 bit indication).

In various embodiments, a UE receives a PBCH in a shifted SS/PBCH block indicating a SFN and location of a half frame within a radio frame for a SSB candidate of SSB index 0 in the shifted SSB burst in which the half frame (e.g., the first or second half of the radio frame) includes the shifted SSB candidate of SSB index 0. In such embodiments, timing uncertainty due to shifting of the SSB burst may be within a half frame (e.g., 5 ms) and, accordingly, a maximum number of possible slot shift values within the half frame may be 80 (e.g., 16 slots per 1 ms*5 ms). Thus, the maximum number of bits used to indicate the time shift value in terms of the number of slots is 7, and a total of 8 bits are included in PDSCH carrying SIB1 for indicating the timing offset of the time shifted SSB burst with respect to a starting time of the most adjacent half frame window among half frame windows starting earlier than the shifted SSB candidate of SSB index 0 in which the half frame window refers to a first or second half of a radio frame. For a UE performing initial cell selection (e.g., the UE not configured with an SMTC), the UE may perform PSS/SSS timing detection independently in each detection window.

In some embodiments, a network entity may time-shift an SSB burst with a granularity of a half frame (e.g., 5 ms). For example, the time shift value of an SSB burst with respect to a reference SSB burst location may be a multiple of a half frame. In certain embodiments, with a largest supported SSB burst periodicity of 160 ms, a maximum number of bits used to indicate the time shift value in terms of the number of half frames is 5.

In certain embodiments, a maximum allowed time shift value of each SSB candidate or each SSB burst may be predefined or configured for a UE. Accordingly, a number of bits used for indicating a time shift value of a given SSB burst may be reduced. In various embodiments, once a UE detects at least one SSB, the UE may reduce a size of search windows for PSS/SSS detection in later detection windows. In some embodiments, a network entity transmits SS/PBCH blocks within a time interval determined by a maximum allowed time shift value of an SSB burst and a reference SSB burst time location.

In various embodiments, using an indication of a time shift of an SSB burst together with a higher layer parameter (e.g., ssb-PositionsInBurst) that indicates SSB candidates with actual SS/PBCH transmissions in SIB1, a UE may determine REs for which the UE may not receive other signals or channels due to overlapping with SS/PBCH blocks.

In some embodiments, a network entity may divide an SSB burst into one or more sub-SSB bursts (e.g., a subset of SSB candidates) and transmit a part of an SSB burst (e.g., sub-SSB burst) in one COT. In such embodiments, each sub-SSB burst may have a different time-shift value with respect to a reference sub-SSB burst location, and a respective time shift value may be included in an associated (e.g., quasi-co-location association) PDSCH carrying SIB1 (e.g., as part of an RRC message or appended to information bits corresponding to the RRC message) or in PBCH. This may be useful when the MCOT is 2 ms or 3 ms while a transmission duration for one SSB burst (e.g., 4 ms) is longer than the MCOT. In certain embodiments, if a transmission duration of a sub-SSB burst is less than 1 ms, a network entity may transmit the sub-SSB burst immediately after sensing a channel to be idle for a certain sensing interval. In one example, a UE receives a PBCH in a shifted SS/PBCH block including an SFN of a radio frame and an index of a half frame within the radio frame in which the received (e.g., shifted) SSB is located. In addition, a UE may receive X bits indicating a time shift value with respect to a reference SSB location in terms of a number of SSB occasions or time offset with respect to a half frame boundary in terms of a number of slots (or subframes) in PBCH or PDSCH carrying SIB1.

In various embodiments, a UE receives a PBCH in a shifted SS/PBCH block including a SFN of a radio frame, an index of a half frame within the radio frame in which a SSB candidate of SSB index 0 in the shifted SSB burst is located, and a time offset of the shifted SSB burst with respect to a half frame boundary in terms of a number of subframes (e.g., 0, 1, 2, 3, or 4 subframe shift assuming that one radio frame consists of 10 subframes) if only a subframe-level (e.g., a multiple of 1 ms) time shift of an SSB burst with respect to a reference SSB burst time location is allowed. In some embodiments, an additional 3 bits may be added to an existing payload (e.g., NR PBCH) to indicate a time offset of a shifted SSB burst with respect to a half frame boundary.

FIG. 4 is a schematic block diagram illustrating one embodiment of a reference SSB transmission timing 400. The reference SSB transmission timing 400 illustrated occurs over a COT 402 that includes seven slots 404 (e.g., 0.5 ms slots). The first slot 404 carries a first SSB 406 and a second SSB 408, the second slot 404 carries a third SSB 410 and a fourth SSB 412, the third slot 404 carries a fifth SSB 414 and a sixth SSB 416, and the fourth slot 404 carries a seventh SSB 418 and an eighth SSB 420.

FIG. 5 is a schematic block diagram illustrating one embodiment of an SSB shifting 500 corresponding to the reference SSB transmission timing 400 of FIG. 4. The SSB shifting 500 illustrated SSB transmissions that occur over a COT 502. Slots 504 (e.g., 0.5 ms slots) are also illustrated. The first slot 504 carries a first unused SSB transmission opportunity 506 and a second unused SSB transmission opportunity 508, the second slot 504 carries a third unused SSB transmission opportunity 510 and a first SSB 512, the third slot 504 carries a second SSB 514 and a third SSB 516, the fourth slot 504 carries a fourth SSB 518 and a fifth SSB 520, the fifth slot 504 carries a sixth SSB 522 and a seventh SSB 524, and the sixth slot 504 carries an eighth SSB 526 and a fourth unused SSB transmission opportunity 528. As may be appreciated, an SSB shifting 500 may use any transmission opportunities available for transmitting SSBs. Moreover, the transmission opportunities illustrate only one embodiment of possible transmission opportunities.

In one example, 12 potential SSB transmission occasions (i.e. transmission opportunities) 506, 508, 510, 512, 514, 516, 518, 520, 522, 524, 526, and 528 of FIG. 5 are defined within a DRS transmission window and are indexed from 0 to 11. The DRS transmission window is a configured time interval where a DRS transmission may occur. The DRS includes at least a SSB burst. A UE determines a SSB transmission occasion index of a detected SSB within the DRS transmission window by using a combination of PBCH DMRS sequence index and 1 bit/2 bits (for 15 kHz SCS/30 kHz SCS) of the 3 available bits in the PBCH payload (not in MIB) that were originally used in Rel-15 NR for the frequency range 2 (FR2) as 3 MSBs of an SSB index. In 3GPP Rel-15 NR, FR1 refers to a frequency range of 410 MHz-7125 MHz, and FR2 refers to a frequency range of 24250 MHz-52600 MHz. If 10-bits SFN and a half-frame indicator are included in PBCH as in Rel-15 NR, the UE can identify cell timing information (e.g. frame/slot/symbol timing information). For example, a network entity is allowed to transmit at most four SSBs in each SSB burst. A first SSB can be transmitted one of four SSB transmission occasions {506, 514, 522}, a second SSB can be transmitted one of four SSB transmission occasions {508, 516, 524}, a third SSB can be transmitted one of four SSB transmission occasions {510, 518, 526}, and a fourth SSB can be transmitted one of four SSB transmission occasions {512, 520, 528}. Furthermore, the network entity transmits a SS burst comprising the first, second, third, and fourth SSBs either consecutively or with circular shift. If the UE receives 2 bits in PBCH indicating which SSB out of the first, second, third, and fourth SSBs is transmitted in the beginning of the SS burst and if the UE detects at least one SSB and identifies a corresponding SSB transmission occasion index of the at least one detected SSB, the UE can identify the beginning SSB transmission occasion of the SS burst.

Figure 6:
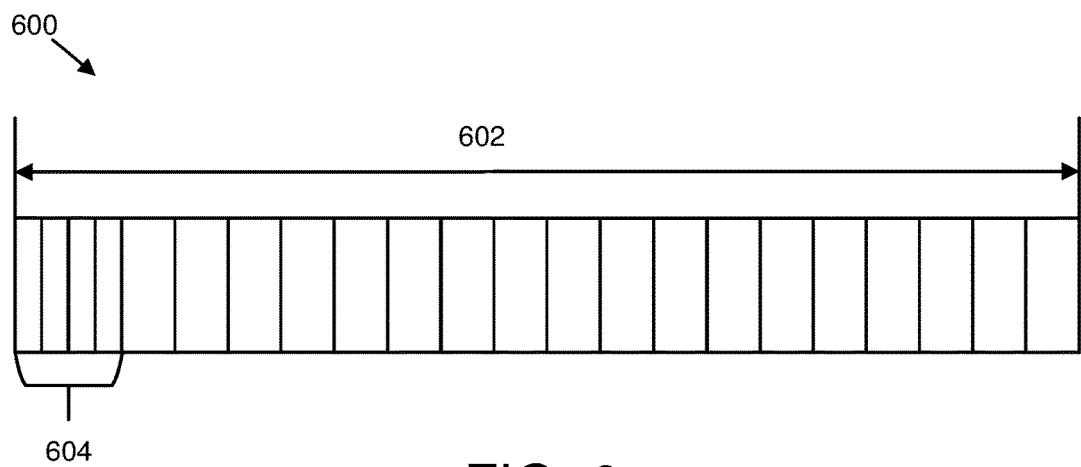
FIG. 6 is a schematic block diagram illustrating another embodiment of a reference SSB transmission timing.

FIG. 6 is a schematic block diagram illustrating another embodiment of a reference SSB transmission timing 600. The reference SSB transmission timing 600 illustrated occurs over a periodicity 602 (e.g., 20 ms SSB periodicity) that includes 40 slots (e.g., 0.5 ms slots). An SSB transmission window (or DRS transmission window) 604 (e.g., first four slots) includes four slots with SSB locations.

Figure 7:
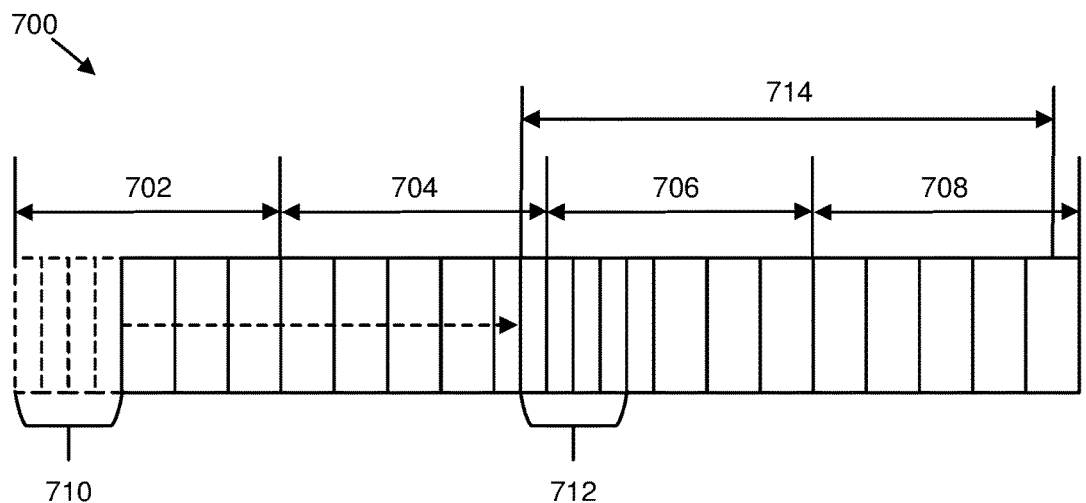
FIG. 7 is a schematic block diagram illustrating one embodiment of an SSB shifting corresponding to the reference SSB transmission timing of FIG. 6.

FIG. 7 is a schematic block diagram illustrating one embodiment of an SSB shifting 700 corresponding to the reference SSB transmission timing 600 of FIG. 6. The SSB shifting 700 includes a first periodicity 702 (e.g., 5 ms) that includes 10 slots (e.g., 0.5 ms slots), a second periodicity 704 (e.g., 5 ms) that includes 10 slots (e.g., 0.5 ms slots), a third periodicity 706 (e.g., 5 ms) that includes 10 slots (e.g., 0.5 ms slots), and a fourth periodicity 708 (e.g., 5 ms) that includes 10 slots (e.g., 0.5 ms slots). An SSB transmission window 710 (e.g., first four slots) includes four slots with SSB locations. The SSB transmission window 710 is shifted (e.g., by +19 slots, 19 slots to the right) to a shifted SSB transmission window 712. Moreover, a COT 714 (e.g., 10 ms COT) includes 20 slots (e.g., 0.5 ms slots).

Figure 8:
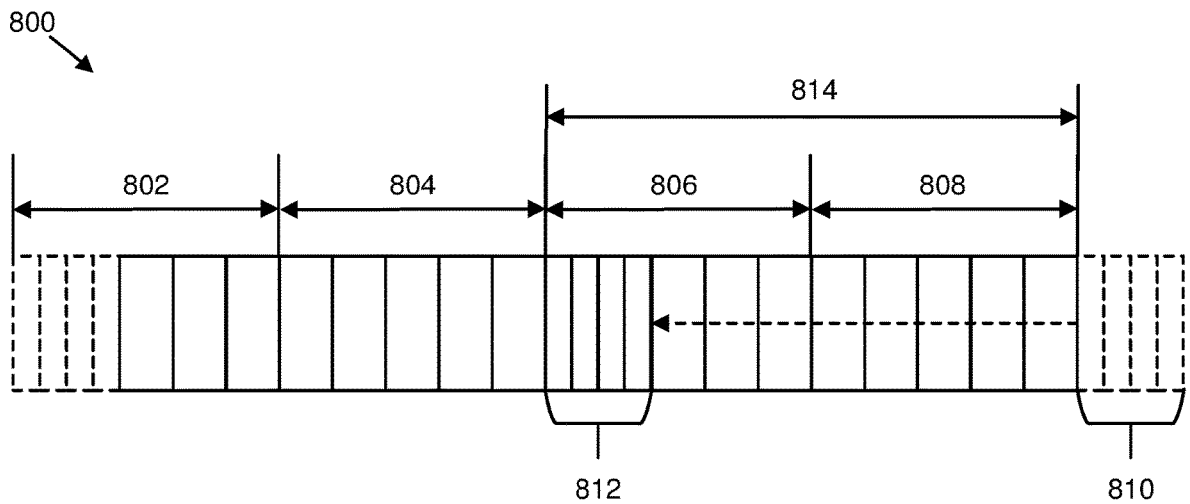
FIG. 8 is a schematic block diagram illustrating another embodiment of an SSB shifting corresponding to the reference SSB transmission timing of FIG. 6.

FIG. 8 is a schematic block diagram illustrating another embodiment of an SSB shifting 800 corresponding to the reference SSB transmission timing 600 of FIG. 6. The SSB shifting 800 includes a first periodicity 802 (e.g., 5 ms) that includes 10 slots (e.g., 0.5 ms slots), a second periodicity 804 (e.g., 5 ms) that includes 10 slots (e.g., 0.5 ms slots), a third periodicity 806 (e.g., 5 ms) that includes 10 slots (e.g., 0.5 ms slots), and a fourth periodicity 808 (e.g., 5 ms) that includes 10 slots (e.g., 0.5 ms slots). An SSB transmission window 810 (e.g., four slots) includes four slots with SSB locations. The SSB transmission window 810 is shifted (e.g., by −20 slots, 20 slots to the left) to a shifted SSB transmission window 812. Moreover, a COT 814 (e.g., 10 ms COT) includes 20 slots (e.g., 0.5 ms slots).

With respect to FIGS. 6, 7, and 8, it should be noted that other DL and/or UL transmissions in addition to SS/PBCH blocks may occur in a COT although not explicitly shown.

In certain embodiments, a slot (or slot-pair (e.g., 240 kHz)) containing one or more SSB candidates may be shifted (e.g., due to unlicensed carrier channel access rules and/or LBT) relative to a half-frame boundary up to a maximum shift of (number of slots or slot pairs (e.g., 240 kHz) per half-frame −1). For example, allowed shifts of 0, 1, 2, 3, or 4 for 15 kHz subcarrier spacing, allowed shifts of 0, 1, 2, . . . 39 for 120 kHz and 240 kHz subcarrier spacing with a possible smaller subset of allowed shift values for embodiments that may reduce a number of bits used for indicating the shift values. In some embodiments, within a slot, a first symbol of SSB candidates within a slot may be shifted relative to a reference SSB (e.g., SS/PBCH block) location. For example, an allowed shift of −2, −1, 0, 1, or 2 symbols for 15 kHz SCS and 30 kHz SCS such that both possible SSB candidates are possible to be transmitted in the same slot; and/or an allowed shift of −4, −3, −2, −1, 0, 1, or 2 for 30 kHz SCS and 120 kHz. In various embodiments, a first symbol shift of SSB candidates within a slot may only apply to a slot containing a lowest indexed SSB candidate that is transmitted (e.g., SSB candidate with SSB index 0) with no first symbol shift of SSB candidates in other slots in an SSB burst or sub-SSB burst (e.g., the network entity may have access to transmit on a channel on other slots). In certain embodiments, a slot or slot-pair shift value and/or symbol shift value may be indicated in a broadcast message, a UE-specific message, on a common SSB indicator broadcast channel, or on a common PDCCH DCI. In some embodiments, a UE derives a half-frame and radio frame timing from a half-frame bit in PBCH and an indicated slot shift value, a slot-pair shift value, and/or a symbol shift value. In various embodiments, SFN information may be provided in PBCH.

In certain embodiments, a UE may determine a control resource set and/or PDCCH monitoring occasions for a Type0-PDCCH common search space set in which the UE may decode PDCCH carrying DL assignment information for PDSCH carrying SIB1 by decoding PBCH.

In various embodiments, such as for SS/PBCH block and a CORESET multiplexing pattern 1, a UE may monitor PDCCH in a Type0-PDCCH common search space over two consecutive slots starting from slot $n_0$. For SS/PBCH block with index i, the UE determines an index of slot $n_0$ as $n_0 = (O \cdot 2^\mu + \lfloor i \cdot M \rfloor) \bmod N_{slot}^{frame,\mu}$ located in a frame with system frame number $SFN_C$ satisfying $SFN_C \bmod 2 = 0$ if $\lfloor (O \cdot 2^\mu + \lfloor i \cdot M \rfloor)/N_{slot}^{frame,\mu} \rfloor \bmod 2 = 0$ or in a frame with SFN satisfying $SFN_C \bmod 2 = 1$ if $\lfloor (O \cdot 2^\mu + \lfloor i \cdot M \rfloor)/N_{slot}^{frame,\mu} \rfloor \bmod 2 = 1$. M and O may be provided by configuration, and $\mu \in \{0,1,2,3\}$ may be based on a subcarrier spacing for PDCCH receptions in a control resource set. The index for the first symbol of the control resource set in slot $n_C$ is a first symbol index in a configuration. In certain embodiments, for the SS/PBCH block and control resource set multiplexing patterns 2 and 3, a UE may monitor PDCCH in the Type0-PDCCH common search space over one slot with Type0-PDCCH common search space periodicity equal to the periodicity of SS/PBCH block.

In one embodiment, a UE may detect at least one SS/PBCH block of a potentially time-shifted SS/PBCH block burst in an unlicensed spectrum, decode a PBCH of the at least one detected SSB, determine a slot boundary of a slot including an SSB candidate of SSB index 0 of the potentially time-shifted SSB burst (i.e. a slot including a beginning SSB occasion of a portion of a plurality of SSB occasions, wherein a plurality of SSBs are transmitted on the portion of the plurality of SSB occasions). In such an embodiment, indexing of SSB candidates in the SSB burst may start from 0. In some embodiments, if a UE receives an indication of an SSB and CORESET multiplexing pattern 1 in MIB, the UE may determine one or more PDCCH monitoring occasions associated with one or more SS/PBCH blocks for SIB1 by applying a group offset 0 with respect to a determined slot boundary of the slot including an SSB candidate of SSB index 0 of the potentially time shifted SSB burst in which the value of 0 is represented in terms of a number of slots based on a 15 kHz subcarrier spacing, or a number of subframes may be provided or configured (e.g., assuming that a subframe has 1 ms duration). In certain embodiments, if a UE receives an indication of an SSB and CORESET multiplexing patterns 2 and 3 in MIB, the UE may determine PDCCH monitoring occasions for SIB1 associated with at least one detected SSB of a potentially time-shifted SSB burst on a same slot or one slot before a slot in which the at least one detected SSB is transmitted. For example, PDCCH monitoring occasions for SIB1 associated with an SSB candidate of SSB index 'i' may be on a same slot or one slot before a slot in which the SSB candidate of SSB index 'i' of a potentially time shifted SSB burst is located. In some embodiments, a first symbol index of PDCCH monitoring occasions may be determined, predetermined, and/or configured.

In certain embodiments, for a PDSCH DMRS sequence, a UE may assume a sequence r(n) is defined by $$r(n) = \frac{1}{\sqrt{2}}(1 - 2 \cdot c(2n)) + j\frac{1}{\sqrt{2}}(1 - 2 \cdot c(2n+1))$$

in which a pseudo-random sequence c(i) is predefined and/or configured. In some embodiments, a pseudo-random sequence generator may be initialized with $c_{init} = (2^{17}(N_{symb}^{slot} n_{s,f}^\mu + l + 1)(2N_{ID}^{nSCID} + 1) + n_{SCID}) \bmod 2^{31}$ in which l is an OFDM symbol number within a slot, $n_{s,f}^\mu$ is a slot number within a frame, and: $N_{ID}^0, N_{ID}^1 \in \{0, 1, \ldots, 65535\}$ are given by higher-layer parameters (e.g., scramblingID0 and scramblingID1) in an IE (e.g., DMRS-DownlinkConfig IE) if provided and PDSCH is scheduled by PDCCH using DCI format 1_1 with CRC scrambled by C-RNTI or CS-RNTI; $N_{ID}^0 \in \{0, 1, \ldots, 65535\}$ is given by a higher-layer parameter (e.g., scramblingID0) in an IE (e.g., the DMRS-DownlinkConfig IE) if provided and the PDSCH is scheduled by PDCCH using DCI format 1_0 with CRC scrambled by C-RNTI or CS-RNTI; or else $N_{ID}^{nSCID} = N_{ID}^{cell}$; and the quantity $n_{SCID} \in \{0, 1\}$ is given by a DMRS sequence initialization field if present in the DCI associated with the PDSCH transmission if DCI format 1_1 is used, or else $n_{SCID} = 0$.

In some embodiments, such as for NR operation in an unlicensed spectrum, a UE may not be aware of a slot number within a frame for a slot in which PDSCH carrying SIB1 is transmitted if a time shift value of an SSB burst is signaled in PDSCH carrying SIB1.

In one embodiment, for a PDSCH DMRS sequence of a PDSCH carrying SIB1, initialization of a pseudo-random sequence generator for the PDSCH DMRS sequence may be based on a slot number within a frame for a reference SSB location of an SSB associated with the PDSCH carrying SIB1. In certain embodiments, initialization of a pseudo-random sequence generator for a PDSCH DMRS sequence of PDSCH carrying SIB1 may not be based on a slot number within a frame but instead be based on an associated SSB index. For example, $n_{s,f}^\mu$ for $C_{init}$ may be one of the following: 1) a slot number within a frame for a reference SSB time location of an associated SSB; 2) a SSB index of the associated SSB; and/or 3) set to zero.

In some embodiments, random access preambles may only be transmitted in frequency resources given by a higher-layer parameter (e.g., msg1-FrequencyStart). In various embodiments, PRACH frequency resources $n_{RA} \in \{0, 1, \ldots, M-1\}$ for which M equals a higher-layer parameter (e.g., msg1-FDM) may be numbered in increasing order within an initial active uplink bandwidth part during initial access starting from a lowest frequency. In certain embodiments, $n_{RA}$ is numbered in increasing order within an active uplink bandwidth part starting from a lowest frequency.

In one embodiment, a UE may be provided a number N of SS/PBCH blocks associated with one PRACH occasion and a number R of contention based preambles per SS/PBCH block by a higher layer parameter (e.g., ssb-perRACH-OccasionAndCB-PreamblesPerSSB). If N<1, one SS/PBCH block may be mapped to 1/N consecutive PRACH occasions. If N≥1, R contention based preambles with consecutive indexes associated with SS/PBCH block n, 0≤n≤N−1, per PRACH occasion start from preamble index n·64/N. SS/PBCH block indexes may be mapped to PRACH occasions in the following order: first, in increasing order of preamble indexes within a single PRACH occasion; second, in increasing order of frequency resource indexes for frequency multiplexed PRACH occasions; third, in increasing order of time resource indexes for time multiplexed PRACH occasions within a PRACH slot; and fourth, in increasing order of indexes for PRACH slots.

In some embodiments, an association period starting from frame 0 for mapping SS/PBCH blocks to PRACH occasions may be a smallest value in a set determined by a PRACH configuration period according Table 2 such that $N_{Tx}^{SSB}$ SS/PBCH blocks may be mapped at least once to the PRACH occasions within the association period in which a UE obtains $N_{Tx}^{SSB}$ from a value of a higher layer parameter (e.g., ssb-PositionsInBurst in SystemInformationBlock-Type1 and/or in ServingCellConfigCommon). If after an integer number of SS/PBCH blocks to PRACH occasions mapping cycles within the association period there is a set of PRACH occasions that are not mapped to $N_{Tx}^{SSB}$ SS/PBCH blocks, no SS/PBCH blocks may be mapped to the set of PRACH occasions. As may be appreciated, an association pattern period may include one or more association periods and may be determined so that a pattern between PRACH occasions and SS/PBCH blocks repeats at most every 160 msec. PRACH occasions not associated with SS/PBCH blocks after an integer number of association periods, if any, may not be used for PRACH transmissions.

TABLE 2

Mapping Between PRACH Configuration Period and SS/PBCH Block to PRACH Occasion Association Period

| PRACH Configuration Period (msec) | Association Period (Number of PRACH Configuration Periods) |
|---|---|
| 10 | {1, 2, 4, 8, 16} |
| 20 | {1, 2, 4, 8} |
| 40 | {1, 2, 4} |
| 80 | {1, 2} |
| 160 | {1} |

In certain embodiments, if a UE changes a serving cell from a first cell to a second cell in which the second cell is deployed in an unlicensed spectrum and an SSB burst includes a set of SSB candidates in the second cell may be time shifted due to LBT and contention based channel access, the UE may not be aware of the time shift value of the SS burst (unless indicated in PBCH) and may be required to identify time/frequency resources for PRACH preamble transmissions in the second cell without decoding PDSCH carrying SIM of the second cell. In such embodiments, the time shift value of the SS burst may not be included in a handover command message because the time shift value is determined dynamically depending on an outcome of LBT and contention based channel access.

In one embodiment, a UE selects an SSB from at least one detected SSB of a potentially time-shifted SSB burst, decodes a PBCH of the selected SSB, determines a slot boundary of a slot including a SSB candidate of SSB index 0 of the potentially time-shifted SSB burst (i.e. a slot including a beginning SSB occasion of a portion of a plurality of SSB occasions, wherein a plurality of SSBs are transmitted on the portion of the plurality of SSB occasions) based on the decoded PBCH, receives a PRACH configuration, and determines one or more PRACH occasions associated with the selected SSB based on the determined slot boundary and a received PRACH configuration. In such an embodiment, the PRACH configuration may be a semi-static configuration that may be signaled via a dedicated RRC message (e.g., a handover command) or via SIB1 and may define a PRACH preamble format and time-domain resources (e.g., subframes, slots, and symbols) including PRACH occasions. In certain embodiments, a UE may assume that potentially time shifted PRACH occasions are valid from a slot boundary of a slot including an SSB candidate of an SSB index 0 of one potentially time-shifted SS burst (i.e. a slot including a beginning SSB occasion of a portion of a plurality of SSB occasions, wherein a plurality of SSBs are transmitted on the portion of the plurality of SSB occasions) until the slot boundary of the slot including the SSB candidate of SSB index 0 of the following potentially time-shifted SS burst.

For example, if a UE receives a PBCH in a detected SSB of a potentially shifted SSB burst indicating a SFN of a radio frame and an index of a half frame within the radio frame in which the SSB candidate of SSB index 0 in the shifted SSB burst is located (or where the detected SSB is located), the UE may determine PRACH occasions potentially time-shifted from the semi-statically configured PRACH occasions, based on the slot boundary of the slot including the SSB candidate of SSB index 0 of the potentially time-shifted SSB burst. If only subframe-level (e.g., a multiple of 1 ms) time shift of an SSB burst with respect to the reference SSB burst time location is allowed, the UE may determine subframe-level time shifted PRACH occasions. In some embodiments in which slot-level time shift (e.g., in multiples of slot duration based on an SSB SCS) of an SSB burst with respect to the reference SSB burst time location is allowed, a UE may determine slot-level time shifted random access occasions.

In certain embodiments, a UE receives an indication of an absolute value of a time difference between a radio frame i in a current cell and a radio frame i in a target cell in a handover command message of which a network entity (e.g., gNB) of the current cell may be aware of through message exchanges (e.g., Xn messages) with the target cell. In various embodiments, a UE receives an indication of a time difference (up to a radio frame duration) between a radio frame boundary in a current cell and a radio frame boundary in a target cell in a handover command message of which the current cell may be aware of through message exchanges (e.g., Xn messages) with the target cell. In such embodiments, an SFN of the current cell and the SFN of the target cell may not be the same.

In some embodiments, a multitude of PRACH time and frequency resources are provided to a UE in a HO command. In such embodiments, the UE may perform LBT on these resources and transmit a HO complete message if successful (e.g., continue more than 1 RACH procedure until the HO complete message is successfully transmitted, until successful Msg1 transmission, or until Msg2 transmission).

In various embodiments, if an SMTC window may be numbered then a UE may indicate to a network entity that on an SMTC window(s) (e.g., SMTC window indexes p, q, and r) the UE could not detect or measure with enough accuracy one or more SSBs which were detected and measured in other SMTC windows. In such embodiments, the UE may be configured explicitly or implicitly to include and/or not to include an SSB measurement result(s) from the SMTC window(s) for a SSB of the one or more SSBs in order to derive a beam and/or cell quality. The SSB based beam and/or cell quality measurements are measurements for RRM.

In certain embodiments, the network entity may take a reported SMTC window(s) (e.g., SMTC window indexes p, q, and r) and check whether a corresponding SSB has been transmitted or not (e.g., the SSB may not be transmitted because of failed contention based channel access) and then take this into account to find a properly adjusted quality of a reported beam and/or cell quality.

In some embodiments, the following signaling structure for reporting SSB measurements may be used:

```
ResultsPerSSB-IndexList::=  SEQUENCE (SIZE (1..maxNrofSSBs)) OF
ResultsPerSSB-Index
ResultsPerSSB-Index ::=  SEQUENCE {
    ssb-Index               SSB-Index,
    ssb-Results             MeasQuantityResults
    OPTIONAL
}
```

In various embodiments, a UE monitors one PO per DRX cycle in which a PO is a set of PDCCH monitoring occasions and may include multiple time slots (e.g., subframes or OFDM symbols) in which paging DCI may be sent. One PF may be one radio frame and may contain one or multiple POs or starting points of a PO. In multi-beam operations, a length of one PO may be one period of beam sweeping and a UE may assume that a same paging message is repeated in all beams of a sweeping pattern, and the selection of beams for reception of a paging message may be up to UE implementation. In certain embodiments, PF and PO are determined by the following: 1) SFN for the PF is determined by: (SFN+PF_offset) mod T=(TdivN)*(UE_ID mod N); and 2) Index (i_s), indicating the index of the PO is determined by: i_s=floor (UE_ID/N) mod Ns. The following parameters are used for the calculation of PF and i_s above; T: DRX cycle of the UE (T is determined by the shortest of the UE specific DRX value(s), if configured by RRC and/or upper layers, and a default DRX value broadcast in system information. If UE specific DRX is not configured by RRC or by upper layers, the default value is applied), N: number of total paging frames in T, Ns: number of paging occasions for a PF, PF_offset: offset used for PF determination, UE_ID: 5G-S-TMSI mod 1024.

In certain embodiments, PDCCH monitoring occasions for paging may be determined based on a parameter (e.g., paging-SearchSpace) if configured, or otherwise determined based on a default association (e.g., PDCCH monitoring occasions for paging may be the same as for SIB1). In other embodiments, the PDCCH monitoring occasions for paging are determined according to pagingSearchSpace as specified in 3GPP TS 38.213 and firstPDCCH-MonitoringOccasion-OfPO if configured as specified in 3GPP TS 38.331. When SearchSpaceId=0 is configured for pagingSearchSpace, the PDCCH monitoring occasions for paging are same as for RMSI (i.e. SIB1) as defined in clause 13 in TS 38.213.

In one embodiment, a UE receives parameters (e.g., UE identity, DRX cycle of the UE, number of total paging occasions in DRX cycle of the UE) related to determining a paging occasion in which the paging occasion includes a set of PDCCH monitoring occasions, and determines a paging occasion based on the received parameters and a determined slot boundary of a reference slot. In some embodiments, a reference slot is a slot including an SSB candidate of SSB index 0 of a potentially time-shifted SSB burst (i.e. a slot including a beginning SSB occasion of a portion of a plurality of SSB occasions, wherein a plurality of SSBs are transmitted on the portion of the plurality of SSB occasions), and a UE may determine a slob boundary of the reference slot by detecting at least one SSB of the potentially time-shifted SSB burst and decoding PBCH of the at least one detected SSB.

In various embodiments, a UE searches for paging within a paging occasion window. In such embodiments, the UE may have an extended paging occasion such that an extension of a paging occasion (e.g., PO-window) may be dependent on how congested a channel is. In some embodiments, a broadcast signaling may not be efficient to indicate dynamic changes of the paging occasion, but a UE-group specific WUS may be used (e.g., a different WUS sequence can indicate a different duration of PO-window). In such embodiments, a presence of WUS may indicate if a PO-window is following (e.g., meaning some UEs are being paged). In certain embodiments, WUS may be subjected to access type 2 LBT.

Figure 9:
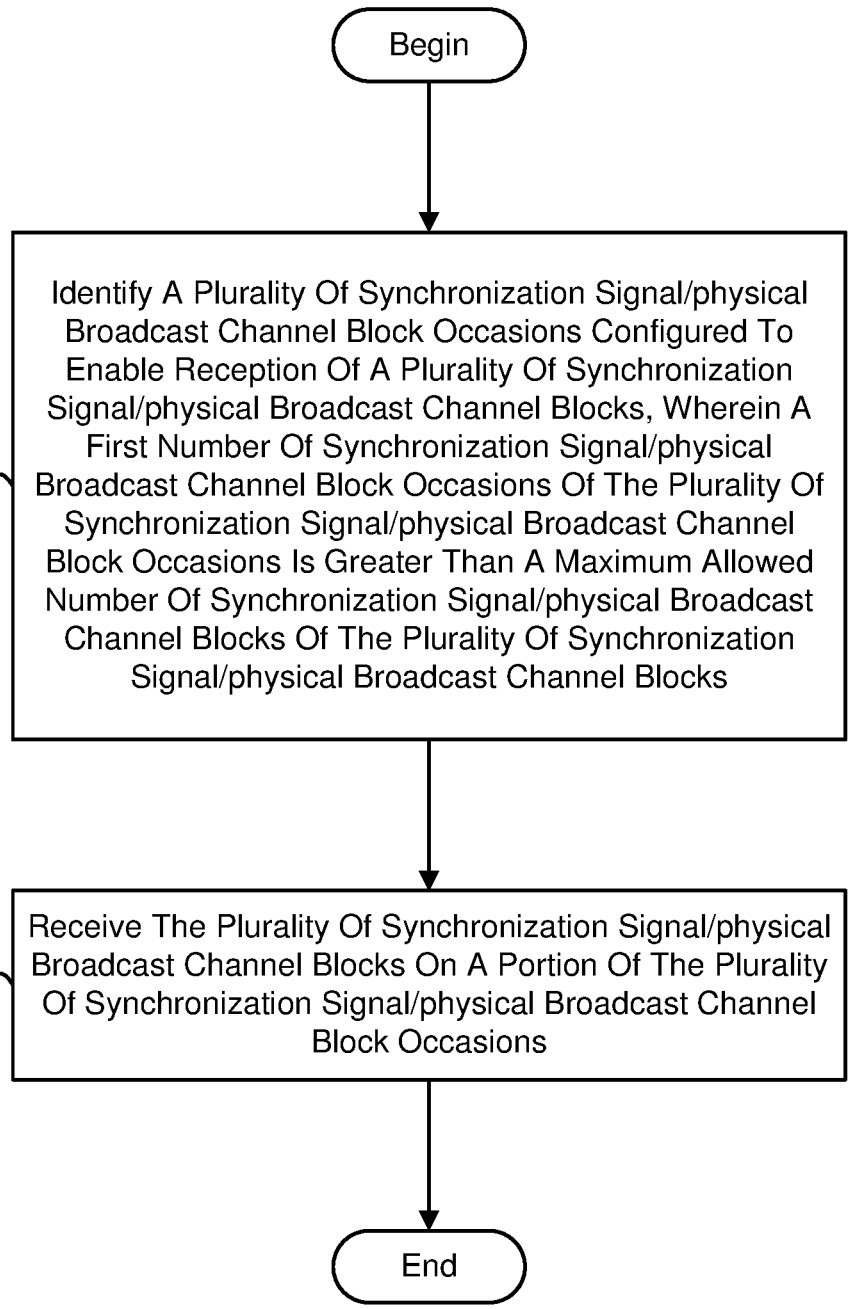
FIG. 9 is a flow chart diagram illustrating one embodiment of a method for identifying synchronization signal/physical broadcast channel block occasions.

FIG. 9 is a flow chart diagram illustrating one embodiment of a method 900 for identifying synchronization signal/physical broadcast channel block occasions. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include identifying 902 a plurality of synchronization signal/physical broadcast channel block occasions configured to enable reception of a plurality of synchronization signal/physical broadcast channel blocks. In such an embodiment, a first number of synchronization signal/physical broadcast channel block occasions of the plurality of synchronization signal/physical broadcast channel block occasions is greater than a maximum allowed number of synchronization signal/physical broadcast channel blocks of the plurality of synchronization signal/physical broadcast channel blocks. In certain embodiments, the method 900 includes receiving 904 the plurality of synchronization signal/physical broadcast channel blocks on a portion of the plurality of synchronization signal/physical broadcast channel block occasions.

In certain embodiments, the method 900 further comprises: receiving information of the portion of the plurality of synchronization signal/physical broadcast channel occasions that is occupied by the plurality of synchronization signal/physical broadcast channel blocks, and determining resource elements on which signals or channels other than the plurality of synchronization signal/physical broadcast channel blocks are not expected to be received.

In some embodiments, the information of the portion of the plurality of synchronization signal/physical broadcast channel block occasions comprises at least an indication of occupied synchronization signal/physical broadcast channel block occasions out of a set of consecutive synchronization signal/physical broadcast channel block occasions, the set of consecutive synchronization signal/physical broadcast channel block occasions is a subset of the plurality of synchronization signal/physical broadcast channel block occasions, and a second number of synchronization signal/physical broadcast channel block occasions of the set of consecutive synchronization signal/physical broadcast channel block occasions is the same as the maximum allowed number of synchronization signal/physical broadcast channel blocks.

In various embodiments, the indication of occupied synchronization signal/physical broadcast channel block occasions out of the set of consecutive synchronization signal/physical broadcast channel block occasions is semi-statically received via a higher-layer signaling. In one embodiment, the method 900 further comprises determining whether to include a measurement instance of a synchronization signal/physical broadcast channel block of the plurality of synchronization signal/physical broadcast channel blocks for measurement of the synchronization signal/physical broadcast channel block based on the information of the portion of the plurality of synchronization signal/physical broadcast channel block occasions.

In certain embodiments, a beginning synchronization signal/physical broadcast channel block occasion of the portion of the plurality of synchronization signal/physical broadcast channel block occasions on which the plurality of synchronization signal/physical broadcast channel blocks is received is determined based on a listen-before-talk procedure. In some embodiments, the method 900 further comprises receiving information indicating the beginning synchronization signal/physical broadcast channel block occasion. In various embodiments, the information is received in a physical broadcast channel, a physical downlink shared channel carrying a system information block, or a combination thereof.

In one embodiment, the information is received via a group common physical downlink control channel. In certain embodiments, the method 900 further comprises determining, based on the information, a common control resource set and one or more physical downlink control channel monitoring occasions associated with receiving a system information block. In some embodiments, the method 900 further comprises: receiving parameters related to determining a paging occasion, wherein the paging occasion comprises a set of physical downlink control channel monitoring occasions; and determining the paging occasion based on the parameters and the information. In various embodiments, the method 900 further comprises receiving an indication of an extension of the paging occasion.

Figure 10:
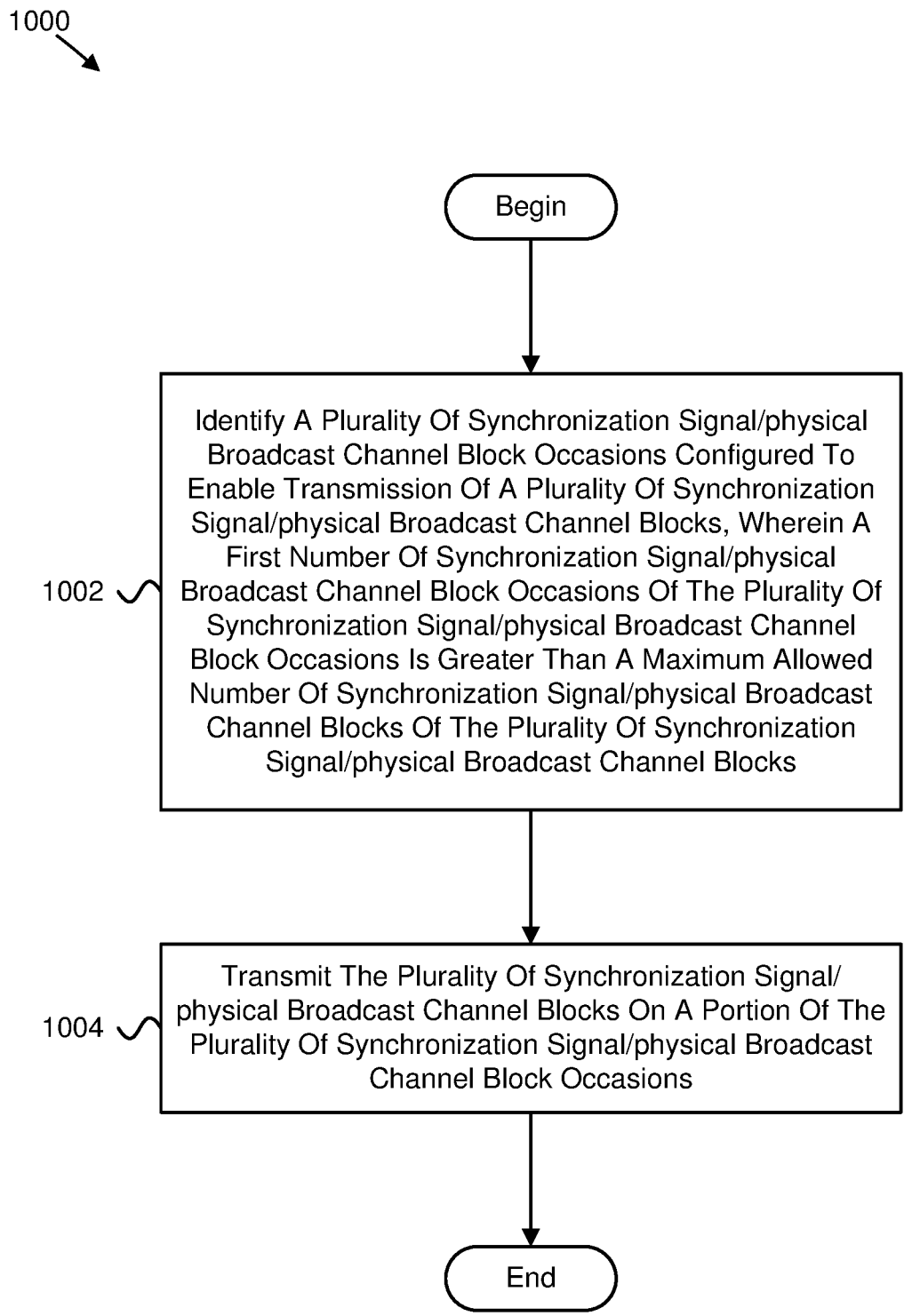
FIG. 10 is a flow chart diagram illustrating another embodiment of a method for identifying synchronization signal/physical broadcast channel block occasions.

FIG. 10 is a flow chart diagram illustrating another embodiment of a method 1000 for identifying synchronization signal/physical broadcast channel block occasions. In some embodiments, the method 1000 is performed by an apparatus, such as the network unit 104. In certain embodiments, the method 1000 may be performed by a processor executing program code, for example, a microcontroller, a microprocessor, a CPU, a GPU, an auxiliary processing unit, a FPGA, or the like.

The method 1000 may include identifying 1002 a plurality of synchronization signal/physical broadcast channel block occasions configured to enable transmission of a plurality of synchronization signal/physical broadcast channel blocks. In such an embodiment, a first number of synchronization signal/physical broadcast channel block occasions of the plurality of synchronization signal/physical broadcast channel block occasions is greater than a maximum allowed number of synchronization signal/physical broadcast channel blocks of the plurality of synchronization signal/physical broadcast channel blocks. In certain embodiments, the method 1000 includes transmitting 1004 the plurality of synchronization signal/physical broadcast channel blocks on a portion of the plurality of synchronization signal/physical broadcast channel block occasions.

In certain embodiments, the method 1000 further comprises transmitting information of the portion of the plurality of synchronization signal/physical broadcast channel block occasions that is occupied by the plurality of synchronization signal/physical broadcast channel blocks.

In some embodiments, the information of the portion of the plurality of synchronization signal/physical broadcast channel block occasions comprises at least an indication of occupied synchronization signal/physical broadcast channel block occasions out of a set of consecutive synchronization signal/physical broadcast channel block occasions, the set of consecutive synchronization signal/physical broadcast channel block occasions is a subset of the plurality of synchronization signal/physical broadcast channel block occasions, and a second number of synchronization signal/physical broadcast channel block occasions of the set of consecutive synchronization signal/physical broadcast channel block occasions is the same as the maximum allowed number of synchronization signal/physical broadcast channel blocks.

In various embodiments, the indication of occupied synchronization signal/physical broadcast channel block occasions out of the set of consecutive synchronization signal/physical broadcast channel block occasions is semi-statically transmitted via a higher-layer signaling. In one embodiment, a beginning synchronization signal/physical broadcast channel block occasion of the portion of the plurality of synchronization signal/physical broadcast channel block occasions on which the plurality of synchronization signal/physical broadcast channel blocks is transmitted is determined based on a listen-before-talk procedure.

In certain embodiments, the method 1000 further comprises transmitting information indicating the beginning synchronization signal/physical broadcast channel block occasion. In some embodiments, the information is transmitted in a physical broadcast channel, a physical downlink shared channel carrying a system information block, or a combination thereof. In various embodiments, the information is transmitted via a group common physical downlink control channel.

In one embodiment, the method 1000 further comprises transmitting parameters related to determining a paging occasion, wherein the paging occasion comprises a set of physical downlink control channel monitoring occasions. In certain embodiments, the method 1000 further comprises transmitting an indication of an extension of the paging occasion.

In one embodiment, a method comprises: identifying a plurality of synchronization signal/physical broadcast channel block occasions configured to enable reception of a plurality of synchronization signal/physical broadcast channel blocks, wherein a first number of synchronization signal/physical broadcast channel block occasions of the plurality of synchronization signal/physical broadcast channel block occasions is greater than a maximum allowed number of synchronization signal/physical broadcast channel blocks of the plurality of synchronization signal/physical broadcast channel blocks; and receiving the plurality of synchronization signal/physical broadcast channel blocks on a portion of the plurality of synchronization signal/physical broadcast channel block occasions.

In certain embodiments, the method further comprises: receiving information of the portion of the plurality of synchronization signal/physical broadcast channel block occasions that is occupied by the plurality of synchronization signal/physical broadcast channel blocks, and determining resource elements on which signals or channels other than the plurality of synchronization signal/physical broadcast channel blocks are not expected to be received.

In some embodiments, the information of the portion of the plurality of synchronization signal/physical broadcast channel block occasions comprises at least an indication of occupied synchronization signal/physical broadcast channel block occasions out of a set of consecutive synchronization signal/physical broadcast channel block occasions, the set of consecutive synchronization signal/physical broadcast channel block occasions is a subset of the plurality of synchronization signal/physical broadcast channel block occasions, and a second number of synchronization signal/physical broadcast channel block occasions of the set of consecutive synchronization signal/physical broadcast channel block occasions is the same as the maximum allowed number of synchronization signal/physical broadcast channel blocks.

In various embodiments, the indication of occupied synchronization signal/physical broadcast channel block occasions out of the set of consecutive synchronization signal/physical broadcast channel block occasions is semi-statically received via a higher-layer signaling.

In one embodiment, the method further comprises determining whether to include a measurement instance of a synchronization signal/physical broadcast channel block of the plurality of synchronization signal/physical broadcast channel blocks for measurement of the synchronization signal/physical broadcast channel block based on the information of the portion of the plurality of synchronization signal/physical broadcast channel block occasions.

In certain embodiments, a beginning synchronization signal/physical broadcast channel block occasion of the portion of the plurality of synchronization signal/physical broadcast channel block occasions on which the plurality of synchronization signal/physical broadcast channel blocks is received is determined based on a listen-before-talk procedure.

In some embodiments, the method further comprises receiving information indicating the beginning synchronization signal/physical broadcast channel block occasion.

In various embodiments, the information is received in a physical broadcast channel, a physical downlink shared channel carrying a system information block, or a combination thereof.

In one embodiment, the information is received via a group common physical downlink control channel.

In certain embodiments, the method further comprises determining, based on the information, a common control resource set and one or more physical downlink control channel monitoring occasions associated with receiving a system information block.

In some embodiments, the method further comprises: receiving parameters related to determining a paging occasion, wherein the paging occasion comprises a set of physical downlink control channel monitoring occasions; and determining the paging occasion based on the parameters and the information.

In various embodiments, the method further comprises receiving an indication of an extension of the paging occasion.

In one embodiment, an apparatus comprises: a processor that identifies a plurality of synchronization signal/physical broadcast channel block occasions configured to enable reception of a plurality of synchronization signal/physical broadcast channel blocks, wherein a first number of synchronization signal/physical broadcast channel block occasions of the plurality of synchronization signal/physical broadcast channel block occasions is greater than a maximum allowed number of synchronization signal/physical broadcast channel blocks of the plurality of synchronization signal/physical broadcast channel blocks; and a receiver that receives the plurality of synchronization signal/physical broadcast channel blocks on a portion of the plurality of synchronization signal/physical broadcast channel block occasions.

In certain embodiments: the receiver receives information of the portion of the plurality of synchronization signal/physical broadcast channel block occasions that is occupied by the plurality of synchronization signal/physical broadcast channel blocks, and the processor determines resource elements on which signals or channels other than the plurality of synchronization signal/physical broadcast channel blocks are not expected to be received.

In some embodiments, the information of the portion of the plurality of synchronization signal/physical broadcast channel block occasions comprises at least an indication of occupied synchronization signal/physical broadcast channel block occasions out of a set of consecutive synchronization signal/physical broadcast channel block occasions, the set of consecutive synchronization signal/physical broadcast channel block occasions is a subset of the plurality of synchronization signal/physical broadcast channel block occasions, and a second number of synchronization signal/physical broadcast channel block occasions of the set of consecutive synchronization signal/physical broadcast channel block occasions is the same as the maximum allowed number of synchronization signal/physical broadcast channel blocks.

In various embodiments, the indication of occupied synchronization signal/physical broadcast channel block occasions out of the set of consecutive synchronization signal/physical broadcast channel block occasions is semi-statically received via a higher-layer signaling.

In one embodiment, the processor determines whether to include a measurement instance of a synchronization signal/physical broadcast channel block of the plurality of synchronization signal/physical broadcast channel blocks for measurement of the synchronization signal/physical broadcast channel block based on the information of the portion of the plurality of synchronization signal/physical broadcast channel block occasions.

In certain embodiments, a beginning synchronization signal/physical broadcast channel block occasion of the portion of the plurality of synchronization signal/physical broadcast channel block occasions on which the plurality of synchronization signal/physical broadcast channel blocks is received is determined based on a listen-before-talk procedure.

In some embodiments, the receiver receives information indicating the beginning synchronization signal/physical broadcast channel block occasion.

In various embodiments, the information is received in a physical broadcast channel, a physical downlink shared channel carrying a system information block, or a combination thereof.

In one embodiment, the information is received via a group common physical downlink control channel.

In certain embodiments, the processor determines, based on the information, a common control resource set and one or more physical downlink control channel monitoring occasions associated with receiving a system information block.

In some embodiments: the receiver receives parameters related to determining a paging occasion, wherein the paging occasion comprises a set of physical downlink control channel monitoring occasions; and the processor determines the paging occasion based on the parameters and the information.

In various embodiments, the receiver receives an indication of an extension of the paging occasion.

In one embodiment, a method comprises: identifying a plurality of synchronization signal/physical broadcast channel block occasions configured to enable transmission of a plurality of synchronization signal/physical broadcast channel blocks, wherein a first number of synchronization signal/physical broadcast channel block occasions of the plurality of synchronization signal/physical broadcast channel block occasions is greater than a maximum allowed number of synchronization signal/physical broadcast channel blocks of the plurality of synchronization signal/physical broadcast channel blocks; and transmitting the plurality of synchronization signal/physical broadcast channel blocks on a portion of the plurality of synchronization signal/physical broadcast channel block occasions.

In certain embodiments, the method further comprises transmitting information of the portion of the plurality of synchronization signal/physical broadcast channel block occasions that is occupied by the plurality of synchronization signal/physical broadcast channel blocks.

In some embodiments, the information of the portion of the plurality of synchronization signal/physical broadcast channel block occasions comprises at least an indication of occupied synchronization signal/physical broadcast channel block occasions out of a set of consecutive synchronization signal/physical broadcast channel block occasions, the set of consecutive synchronization signal/physical broadcast channel block occasions is a subset of the plurality of synchronization signal/physical broadcast channel block occasions, and a second number of synchronization signal/physical broadcast channel block occasions of the set of consecutive synchronization signal/physical broadcast channel block occasions is the same as the maximum allowed number of synchronization signal/physical broadcast channel blocks.

In various embodiments, the indication of occupied synchronization signal/physical broadcast channel block occasions out of the set of consecutive synchronization signal/physical broadcast channel block occasions is semi-statically transmitted via a higher-layer signaling.

In one embodiment, a beginning synchronization signal/physical broadcast channel block occasion of the portion of the plurality of synchronization signal/physical broadcast channel block occasions on which the plurality of synchronization signal/physical broadcast channel blocks is transmitted is determined based on a listen-before-talk procedure.

In certain embodiments, the method further comprises transmitting information indicating the beginning synchronization signal/physical broadcast channel block occasion.

In some embodiments, the information is transmitted in a physical broadcast channel, a physical downlink shared channel carrying a system information block, or a combination thereof.

In various embodiments, the information is transmitted via a group common physical downlink control channel.

In one embodiment, the method further comprises transmitting parameters related to determining a paging occasion, wherein the paging occasion comprises a set of physical downlink control channel monitoring occasions.

In certain embodiments, the method further comprises transmitting an indication of an extension of the paging occasion.

In one embodiment, an apparatus comprises: a processor that identifies a plurality of synchronization signal/physical broadcast channel block occasions configured to enable transmission of a plurality of synchronization signal/physical broadcast channel blocks, wherein a first number of synchronization signal/physical broadcast channel block occasions of the plurality of synchronization signal/physical broadcast channel block occasions is greater than a maximum allowed number of synchronization signal/physical broadcast channel blocks of the plurality of synchronization signal/physical broadcast channel blocks; and a transmitter that transmits the plurality of synchronization signal/physical broadcast channel blocks on a portion of the plurality of synchronization signal/physical broadcast channel block occasions.

In certain embodiments, the transmitter transmits information of the portion of the plurality of synchronization signal/physical broadcast channel block occasions that is occupied by the plurality of synchronization signal/physical broadcast channel blocks.

In some embodiments, the information of the portion of the plurality of synchronization signal/physical broadcast channel block occasions comprises at least an indication of occupied synchronization signal/physical broadcast channel block occasions out of a set of consecutive synchronization signal/physical broadcast channel block occasions, the set of consecutive synchronization signal/physical broadcast channel block occasions is a subset of the plurality of synchronization signal/physical broadcast channel block occasions, and a second number of synchronization signal/physical broadcast channel block occasions of the set of consecutive synchronization signal/physical broadcast channel block occasions is the same as the maximum allowed number of synchronization signal/physical broadcast channel blocks.

In various embodiments, the indication of occupied synchronization signal/physical broadcast channel block occasions out of the set of consecutive synchronization signal/physical broadcast channel block occasions is semi-statically transmitted via a higher-layer signaling.

In one embodiment, a beginning synchronization signal/physical broadcast channel block occasion of the portion of the plurality of synchronization signal/physical broadcast channel block occasions on which the plurality of synchronization signal/physical broadcast channel blocks is transmitted is determined based on a listen-before-talk procedure.

In certain embodiments, the transmitter transmits information indicating the beginning synchronization signal/physical broadcast channel block occasion.

In some embodiments, the information is transmitted in a physical broadcast channel, a physical downlink shared channel carrying a system information block, or a combination thereof.

In various embodiments, the information is transmitted via a group common physical downlink control channel.

In one embodiment, the transmitter transmits parameters related to determining a paging occasion, wherein the paging occasion comprises a set of physical downlink control channel monitoring occasions.

In certain embodiments, the transmitter transmits an indication of an extension of the paging occasion.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
identifying a plurality of synchronization signal/physical broadcast channel block occasions configured to enable reception of a plurality of synchronization signal/physical broadcast channel blocks, wherein a first number of the plurality of synchronization signal/physical broadcast channel block occasions is greater than a maximum number of the plurality of synchronization signal/physical broadcast channel blocks; and
receiving the plurality of synchronization signal/physical broadcast channel blocks on a portion of the plurality of synchronization signal/physical broadcast channel block occasions.

2. The method of claim 1, further comprising:
receiving information of the portion of the plurality of synchronization signal/physical broadcast channel block occasions that is occupied by the plurality of synchronization signal/physical broadcast channel blocks, and
determining resource elements on which signals or channels other than the plurality of synchronization signal/physical broadcast channel blocks are not expected to be received.

3. The method of claim 2, wherein the information of the portion of the plurality of synchronization signal/physical broadcast channel block occasions comprises at least an indication of occupied synchronization signal/physical broadcast channel block occasions out of a set of consecutive synchronization signal/physical broadcast channel block occasions, the set of consecutive synchronization signal/physical broadcast channel block occasions is a subset of the plurality of synchronization signal/physical broadcast channel block occasions, and a second number of synchronization signal/physical broadcast channel block occasions of the set of consecutive synchronization signal/physical broadcast channel block occasions is the same as the maximum number of the plurality of synchronization signal/physical broadcast channel blocks.

4. The method of claim 3, wherein the indication of occupied synchronization signal/physical broadcast channel block occasions out of the set of consecutive synchronization signal/physical broadcast channel block occasions is semi-statically received via a higher-layer signaling.

5. The method of claim 2, further comprising determining whether to include a measurement instance of a synchronization signal/physical broadcast channel block of the plurality of synchronization signal/physical broadcast channel blocks for measurement of the synchronization signal/physical broadcast channel block based on the information of the portion of the plurality of synchronization signal/physical broadcast channel block occasions.

6. The method of claim 1, wherein a beginning synchronization signal/physical broadcast channel block occasion of the portion of the plurality of synchronization signal/physical broadcast channel block occasions on which the plurality of synchronization signal/physical broadcast channel blocks is received is determined based on a listen-before-talk procedure.

7. The method of claim 6, further comprising receiving information indicating the beginning synchronization signal/physical broadcast channel block occasion.

8. The method of claim 7, wherein the information is received in a physical broadcast channel, a physical downlink shared channel carrying a system information block, or a combination thereof.

9. The method of claim 7, wherein the information is received via a group common physical downlink control channel.

10. The method of claim 7, further comprising determining, based on the information, a common control resource set and one or more physical downlink control channel monitoring occasions associated with receiving a system information block.

11. The method of claim 7, further comprising:
receiving parameters related to determining a paging occasion, wherein the paging occasion comprises a set of physical downlink control channel monitoring occasions; and
determining the paging occasion based on the parameters and the information.

12. The method of claim 11, further comprising receiving an indication of an extension of the paging occasion.

13. An apparatus comprising:
a processor that identifies a plurality of synchronization signal/physical broadcast channel block occasions configured to enable reception of a plurality of synchronization signal/physical broadcast channel blocks, wherein a first number of the plurality of synchronization signal/physical broadcast channel block occasions is greater than a maximum number of the plurality of synchronization signal/physical broadcast channel blocks; and
a receiver that receives the plurality of synchronization signal/physical broadcast channel blocks on a portion of the plurality of synchronization signal/physical broadcast channel block occasions.

14. The apparatus of claim 13, wherein:
the receiver receives information of the portion of the plurality of synchronization signal/physical broadcast channel block occasions that is occupied by the plurality of synchronization signal/physical broadcast channel blocks, and
the processor determines resource elements on which signals or channels other than the plurality of synchronization signal/physical broadcast channel blocks are not expected to be received.

15. The apparatus of claim 14, wherein the information of the portion of the plurality of synchronization signal/physical broadcast channel block occasions comprises at least an indication of occupied synchronization signal/physical broadcast channel block occasions out of a set of consecutive synchronization signal/physical broadcast channel block occasions, the set of consecutive synchronization signal/physical broadcast channel block occasions is a subset of the plurality of synchronization signal/physical broadcast channel block occasions, and a second number of synchronization signal/physical broadcast channel block occasions of the set of consecutive synchronization signal/physical broadcast channel block occasions is the same as the maximum number of the plurality of synchronization signal/physical broadcast channel blocks.

16. The apparatus of claim 15, wherein the indication of occupied synchronization signal/physical broadcast channel block occasions out of the set of consecutive synchronization signal/physical broadcast channel block occasions is semi-statically received via a higher-layer signaling.

17. The apparatus of claim 14, wherein the processor determines whether to include a measurement instance of a synchronization signal/physical broadcast channel block of the plurality of synchronization signal/physical broadcast channel blocks for measurement of the synchronization signal/physical broadcast channel block based on the information of the portion of the plurality of synchronization signal/physical broadcast channel block occasions.

18. The apparatus of claim 13, wherein a beginning synchronization signal/physical broadcast channel block occasion of the portion of the plurality of synchronization signal/physical broadcast channel block occasions on which the plurality of synchronization signal/physical broadcast channel blocks is received is determined based on a listen-before-talk procedure.

19. The apparatus of claim 18, wherein the receiver receives information indicating the beginning synchronization signal/physical broadcast channel block occasion.

20. The apparatus of claim 19, wherein the information is received in a physical broadcast channel, a physical downlink shared channel carrying a system information block, or a combination thereof.

* * * * *